(12) United States Patent
Nakanishi et al.

(10) Patent No.: US 12,730,545 B2
(45) Date of Patent: Sep. 8, 2026

(54) OPERATION ASSISTING DEVICE, OPERATION ASSISTING METHOD, AND OPERATION ASSISTING PROGRAM

(71) Applicant: NTT, Inc., Tokyo (JP)

(72) Inventors: Koki Nakanishi, Tokyo (JP); Fumihiro Yokose, Tokyo (JP); Haruo Oishi, Tokyo (JP)

(73) Assignee: NTT, Inc., Tokyo (JP)

(*) Notice: Subject to any disclaimer, the term of this patent is extended or adjusted under 35 U.S.C. 154(b) by 391 days.

(21) Appl. No.: 18/271,880

(22) PCT Filed: Jan. 13, 2021

(86) PCT No.: PCT/JP2021/000875
§ 371 (c)(1),
(2) Date: Jul. 12, 2023

(87) PCT Pub. No.: WO2022/153404
PCT Pub. Date: Jul. 21, 2022

(65) Prior Publication Data

US 2024/0143131 A1 May 2, 2024

(51) Int. Cl.
*G06F 3/0482* (2013.01)
*G06F 3/0483* (2013.01)

(52) U.S. Cl.
CPC .......... *G06F 3/0482* (2013.01); *G06F 3/0483* (2013.01)

(58) Field of Classification Search
CPC .................................................... G06F 3/0482
See application file for complete search history.

(56) References Cited

U.S. PATENT DOCUMENTS 4,872,167 A * 10/1989 Maezawa et al. ...... G06F 11/00
2009/0319491 A1* 12/2009 Akao et al. ............... G06F 7/06
2013/0198671 A1 8/2013 Kasai
2016/0026637 A1* 1/2016 Kitajima et al. .... G06F 17/3053
2020/0073682 A1* 3/2020 Strinden et al. ........ G06F 9/451
2021/0366099 A1* 11/2021 Liao et al. ............ G06T 7/0002

FOREIGN PATENT DOCUMENTS

JP 2013175164 A 9/2013

OTHER PUBLICATIONS

Nakanishi et al. (2019) "Proposal of consistency check function and feedback function with setting procedure manual in network setting operation" IEICE Technical Report, vol. 119, No. 299.
Futamura et al. (1980) "Design and Implementation of Programs by Problem Analysis Diagram (PAD)" Information Processing Society of Japan, vol. 21, No. 4, pp. 259-267.
Nakanishi et al. (2020) A method for creating a device setting procedure manual that has a branch using a Pad diagram, IEICE Society Conference, Sep. 1, 2020.

* cited by examiner

*Primary Examiner* — James J Debrow

(57) ABSTRACT

A storage unit (14) stores a setting point list (14*b*) in which a predetermined setting point and an operation screen at the setting point are associated with each other. A generation unit (15*b*) sets, as a node, an operation screen on which processing content is reflected, generates an operation screen flow (14*c*) representing a processing order of the node by using an operation manual, and associates the operation screen flow (14*c*) and the setting point. An extraction unit (15*d*) extracts, from the operation screen flow (14*c*), a route from a node corresponding to a screen being operated to a setting point at a subsequent stage of the node. A presentation unit (15*e*) presents, to an operator, an operation screen on the extracted route.

20 Claims, 11 Drawing Sheets

(a)
CREATION OF SETTING POINT LIST
SETTING POINT LIST
(b)
INCLUDING OF SETTING POINTS
OPERATION SCREEN FLOW
BRANCH CONDITION
SETTING POINT LIST
(c)
NAVIGATION OF OPERATION
OPERATION SCREEN FLOW
OPERATOR

Fig. 7

OPERATION SCREEN FLOW

BRANCH CONDITION

BRANCH POINT

SETTING POINT

OPERATOR

| SETTING POINT | OPERATION SCREEN |
| --- | --- |
| **** | |
| SET SECURITY LEVEL OF OO ZONE TO OO | |
| **** | |

OPERATION ASSISTING DEVICE, OPERATION ASSISTING METHOD, AND OPERATION ASSISTING PROGRAM

CROSS-REFERENCE TO RELATED APPLICATIONS

This application is a U.S. National Stage Application filed under 35 U.S.C. § 371 claiming priority to International Patent Application No. PCT/JP2021/000875, filed on 13 Jan. 2021, the disclosure of which is hereby incorporated herein by reference in its entirety.

TECHNICAL FIELD

The present invention relates to an operation support apparatus, an operation support method, and an operation support program.

BACKGROUND ART

In the related art, a technique for supporting creation of a manual by using an operation log, a technique for displaying a manual in cooperation with an operation, a technique for generating an index of a setting manual according to a state of a target apparatus, and the like are known (refer to Non Patent Literatures 1 to 3).

CITATION LIST

Non Patent Literature

- Non Patent Literature 1: Kouki Nakanishi, Nagatoshi Nawa, Takeshi Masuda, Haruo Oishi, and Hiroyuki Nakamura, "Proposal of consistency check function and feedback function with setting procedure manual in network setting operation", IEICE Technical Report, Vol. 119, No. 299, ICM 2019-29, 2019.
- Non Patent Literature 2: Yoshihiko Nimura, Toshio Kawai, and two others, "PAD (Program Analysis Diagram) "Program setting and creation by PAD (Program Analysis Diagram)", Journal of Information Processing Society of Japan, Vol. 21 No. 4, July 1980, pp 259-267
- Non Patent Document 3: Nakanishi Koki, Nawa Nagatoshi, Oishi Haruo, and Nakamura Hiroyuki, "A method for creating a device setting procedure manual that has a branch using a Pad diagram", 2020 IEICE Society Conference, B14-6, 2020.

SUMMARY OF INVENTION

Technical Problem

However, in the related art, it is difficult to confirm that an operation is being performed according to a manual. For example, in a case of confirming whether or not setting of a target apparatus is being performed according to a purpose of a manual, it is necessary to perform an operation by comparing a manual and an operation screen for each procedure. In addition, in a case where a setting item or a setting value is changed according to a purpose or a state of the apparatus, it is necessary to confirm whether or not setting is correctly being performed by comparing the manual with the operation screen in consideration of the purpose or the state of the apparatus.

For this reason, comparing the manual with the operation screen for all operations and results including a large number of operations for which an operator can easily recognize that an operation is correctly being performed without confirming the manual may cause distraction. In this case, the operator may overlook an operation screen that requires advanced determination or attention, or may lose the progress of the operation in the manual. As a result, confirmation of an input operation may be omitted.

The present invention has been made in view of the above circumstances, and an object of the present invention is to reliably confirm that an operation is being performed according to a manual.

Solution to Problem

In order to solve the above-described problems and achieve the object, according to the present invention, there is provided an operation support apparatus including: a storage unit that stores a predetermined setting point and an operation screen at the setting point in association with each other; a generation unit that sets, as a node, an operation screen on which processing content is reflected, generates an operation screen flow representing a processing order of the node by using an operation manual, and associates the operation screen flow with the setting point; an extraction unit that extracts, from the operation screen flow, a route from a node corresponding to a screen being operated to a setting point at a subsequent stage of the node; and a presentation unit that presents, to an operator, an operation screen on the extracted route.

Advantageous Effects of Invention

According to the present invention, it is possible to reliably confirm that an operation is being performed according to a manual.

BRIEF DESCRIPTION OF DRAWINGS

FIG. 7 is a diagram for explaining processing of an extraction unit.

DESCRIPTION OF EMBODIMENTS

Figure 1:
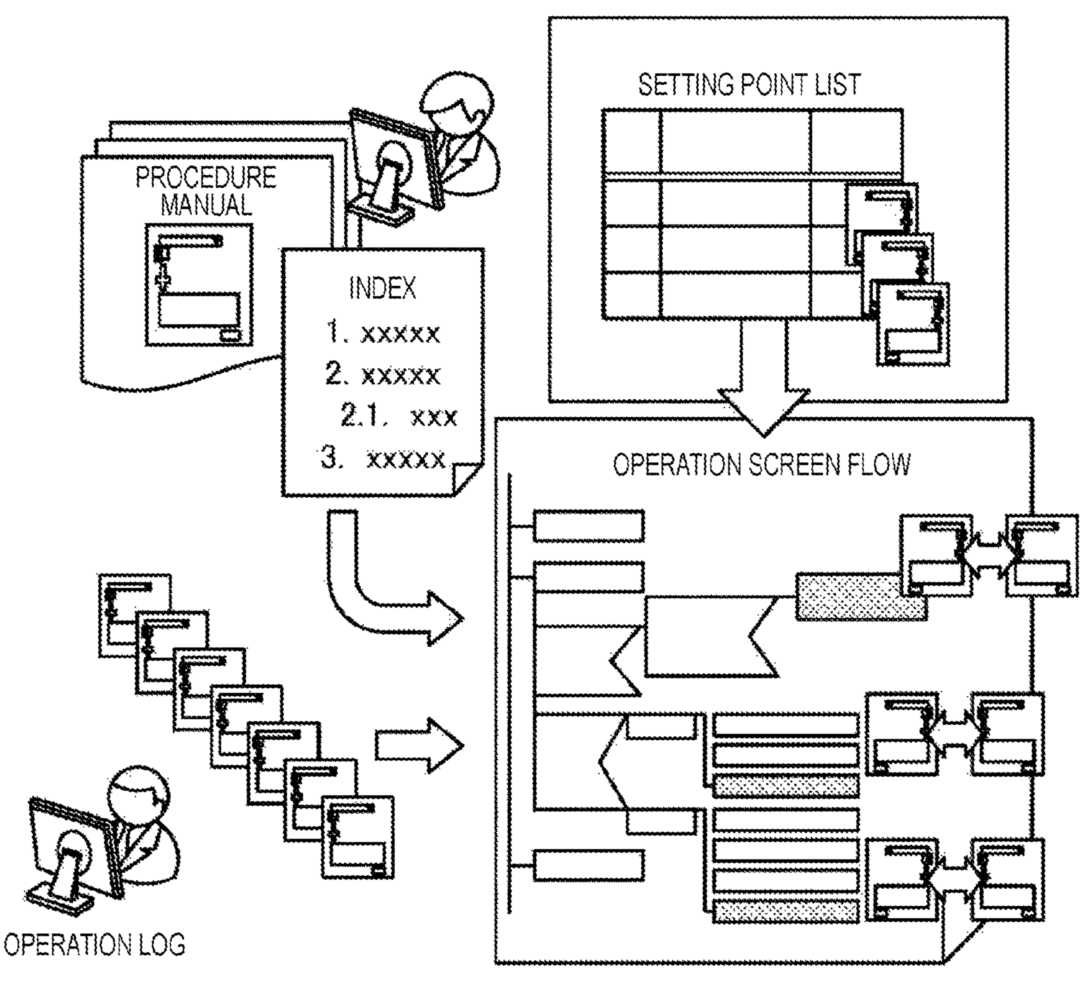
FIG. 1 is a diagram for explaining an outline of an operation support apparatus according to the present embodiment.

Hereinafter, an embodiment of the present invention will be described in detail with reference to the drawings. Note that the present invention is not limited by this embodiment. Further, in the description of the drawings, the same portions are denoted by the same reference numerals.

[Outline of Operation Support Apparatus]

Figure 2:
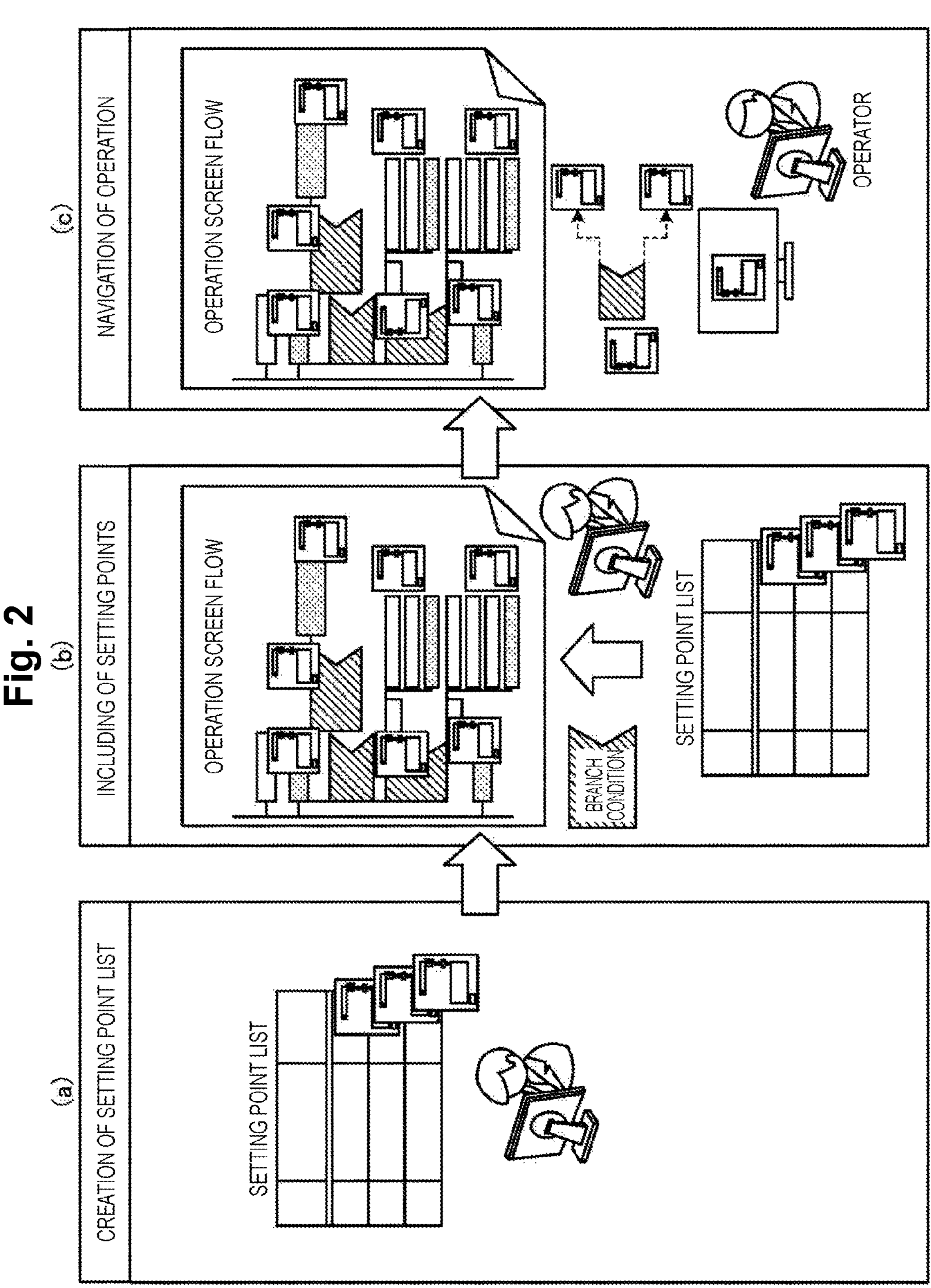
FIG. 2 is a diagram for explaining an outline of the operation support apparatus according to the present embodiment.

FIG. 1 and FIG. 2 are diagrams for explaining an outline of an operation support apparatus according to the present embodiment. As illustrated in FIG. 1, the operation support apparatus includes information of a predetermined setting point, in an operation screen flow in a problem analysis diagram (PAD) format having a tree structure that is generated using an operation screen and an index of a manual (procedure manual). In addition, the operation support apparatus presents an operation screen of the setting point to an operator in a highlighted manner during an operation of processing that passes through the setting point. Further, the operation support apparatus confirms whether or not an input is correct by comparing an operation log of the processing that passes through the setting point with the operation screen of the setting point.

Specifically, as illustrated in FIG. 2(*a*), the operation support apparatus sets in advance, as a predetermined setting point, a description portion or the like as a target of an operation of a manual, and generates a setting point list in which the setting point and an operation screen at the point are associated with each other. In addition, as illustrated in FIG. 2(*b*), the operation support apparatus includes information of the setting point list, in the operation screen flow in the PAD format that is generated from the manual.

In addition, as illustrated in FIG. 2(*c*), the operation support apparatus specifies a point being operated on the operation screen flow, and presents a branch point indicating a branch condition ahead of the point and an operation screen of a setting point ahead of the branch point to the operator in a highlighted manner. Thereby, the operator can reliably confirm that the operation is being performed according to the manual without missing an operation screen such as a branch point that requires advanced determination and attention.

In addition, the operation support apparatus can reliably confirm that the operation is performed according to the manual by comparing a log of the operation screen of the operation that passes through the setting point with the operation screen of the setting point.

[Configuration of Operation Support Apparatus]

Figure 3:
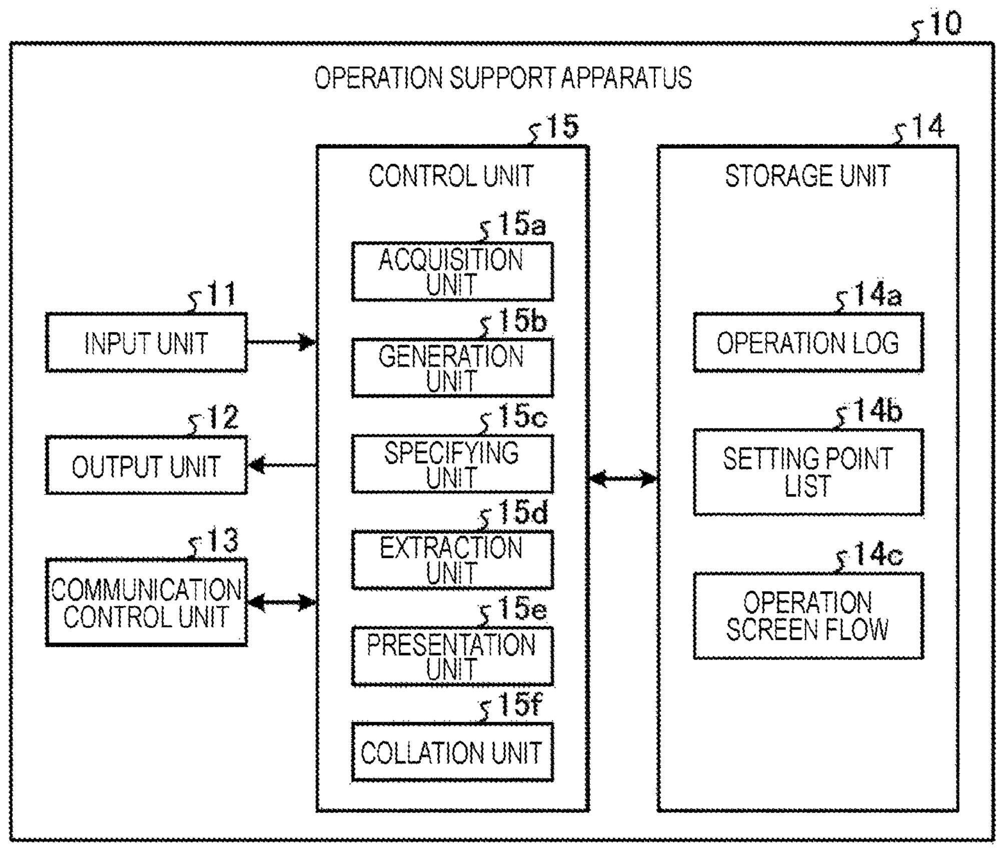
FIG. 3 is a schematic diagram illustrating a schematic configuration of the operation support apparatus according to the present embodiment.

FIG. 3 is a schematic diagram illustrating a schematic configuration of the operation support apparatus according to the present embodiment. As illustrated in FIG. 3, the operation support apparatus 10 according to the present embodiment is realized by a general-purpose computer such as a personal computer, and includes an input unit 11, an output unit 12, a communication control unit 13, a storage unit 14, and a control unit 15.

The input unit 11 is realized by using an input device such as a keyboard or a mouse, and inputs various types of instruction information such as processing start to the control unit 15 in response to an input operation of an operator. The output unit 12 is realized by a display device such as a liquid crystal display, a printing device such as a printer, or the like. For example, the output unit 12 is an operation screen on which an operation by an operator is to be reflected, the operation being a target of operation support processing to be described later. Alternatively, the output unit 12 displays a result of operation support processing to be described later.

The communication control unit 13 is realized by a network interface card (NIC) or the like, and controls communication between an external apparatus and the control unit 15 via a telecommunication line such as a local area network (LAN) or the Internet. For example, the communication control unit 13 controls communication between the control unit 15 and a management apparatus or the like that manages various types of information related to detection of an operation, application processing, and the like. Note that the operation screen on which an operation of an operator is to be reflected may be provided in hardware different from the operation support apparatus 10. In this case, the operation support apparatus 10 performs communication with a terminal operated by the operator via the communication control unit 13.

The storage unit 14 is realized by a semiconductor memory element such as a random access memory (RAM) or a flash memory or a storage device such as a hard disk or an optical disk. In the storage unit 14, a processing program for operating the operation support apparatus 10, data to be used during execution of the processing program, and the like are stored in advance or temporarily stored each time processing is performed. Note that the storage unit 14 may be configured to perform communication with the control unit 15 via the communication control unit 13.

In the present embodiment, the storage unit 14 stores information to be used for operation support processing to be described later, such as an operation log 14*a*, a setting point list 14*b*, and an operation screen flow diagram 14*c*.

The control unit 15 is realized by using a central processing unit (CPU) or the like, and executes a processing program stored in a memory. Thereby, as illustrated in FIG. 3, the control unit 15 functions as an acquisition unit 15*a*, a generation unit 15*b*, a specifying unit 15*c*, an extraction unit 15*d*, a presentation unit 15*e*, and a collation unit 15*f*. Note that each or some of these functional units may be provided in different hardware. Further, the control unit 15 may include other functional units.

The acquisition unit 15*a* acquires, as the operation log 14*a*, an operation screen operated by an operator. For example, the acquisition unit 15*a* acquires, as the operation log 14*a*, image data by capturing a screen operated by an operator. The acquisition unit 15*a* stores the acquired operation log 14*a* in the storage unit 14. At that time, the acquisition unit 15*a* may store the acquired operation log 14*a* in association with, for example, information such as an acquisition timing.

The generation unit 15*b* generates a setting point list 14*b* in which a predetermined setting point and an operation screen at the setting point are associated with each other, and stores the setting point list in the storage unit 14. In addition, the generation unit 15*b* sets, as a node, the operation screen on which processing content is reflected, generates an operation screen flow 14*c* representing a processing order of the node by using the operation manual, and stores the operation screen flow 14*c* in the storage unit 14.

Figure 4:
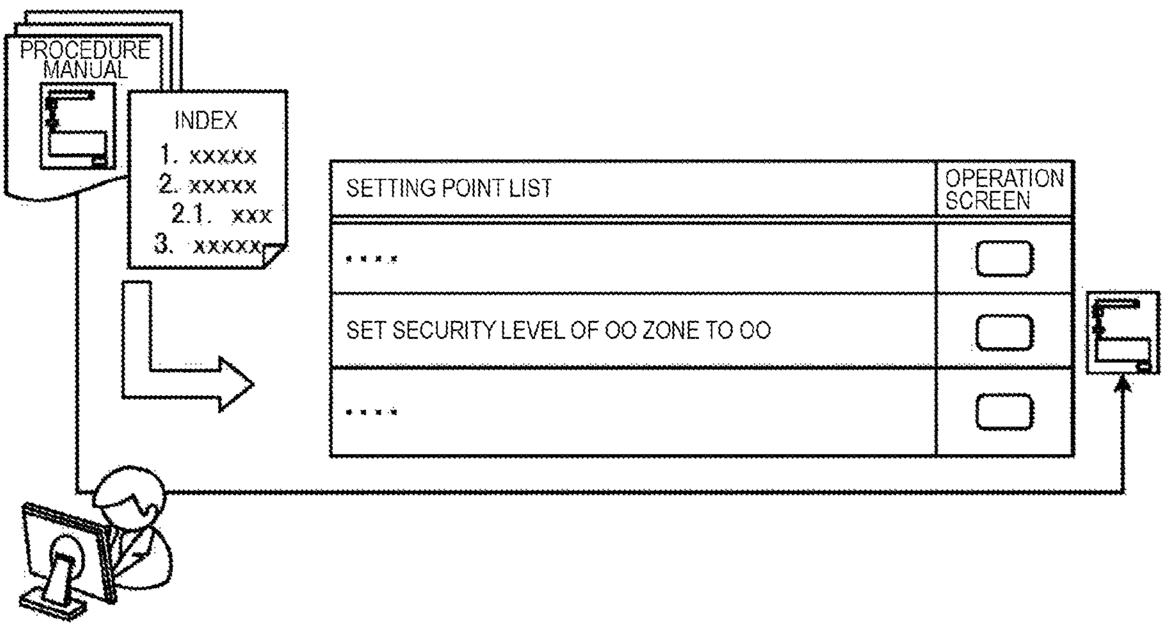
FIG. 4 is a diagram for explaining processing of a generation unit.
Figure 5:
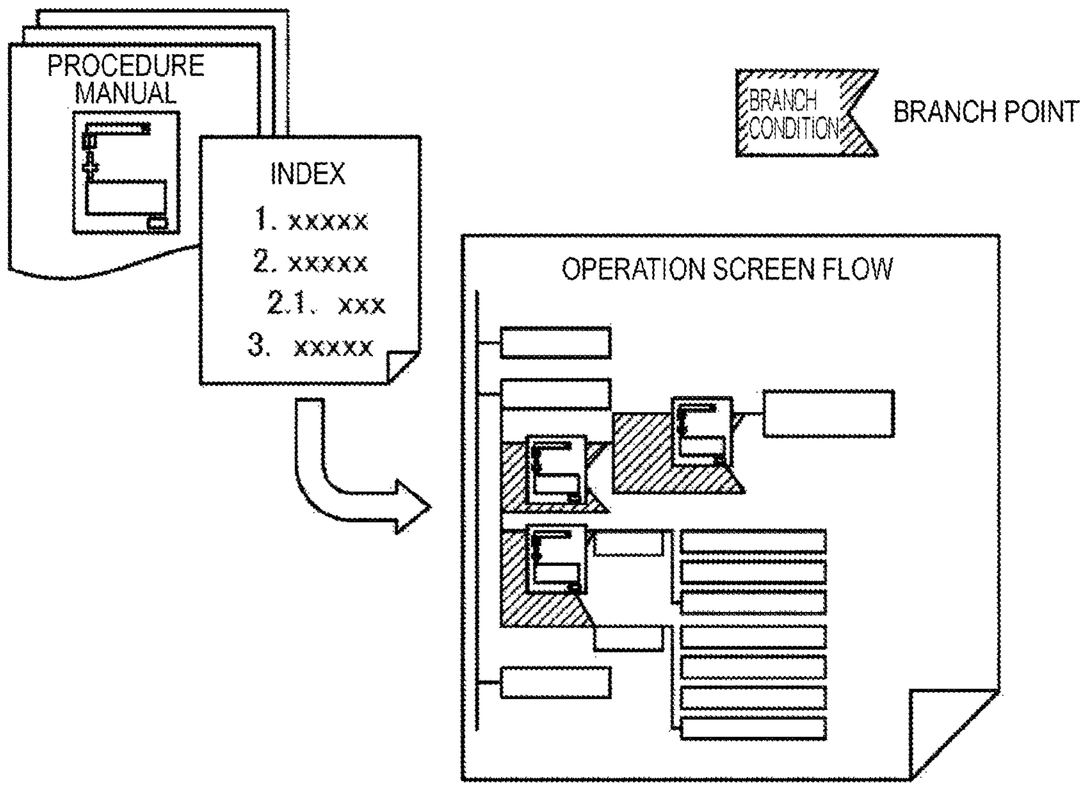
FIG. 5 is a diagram for explaining processing of the generation unit.
Figure 6:
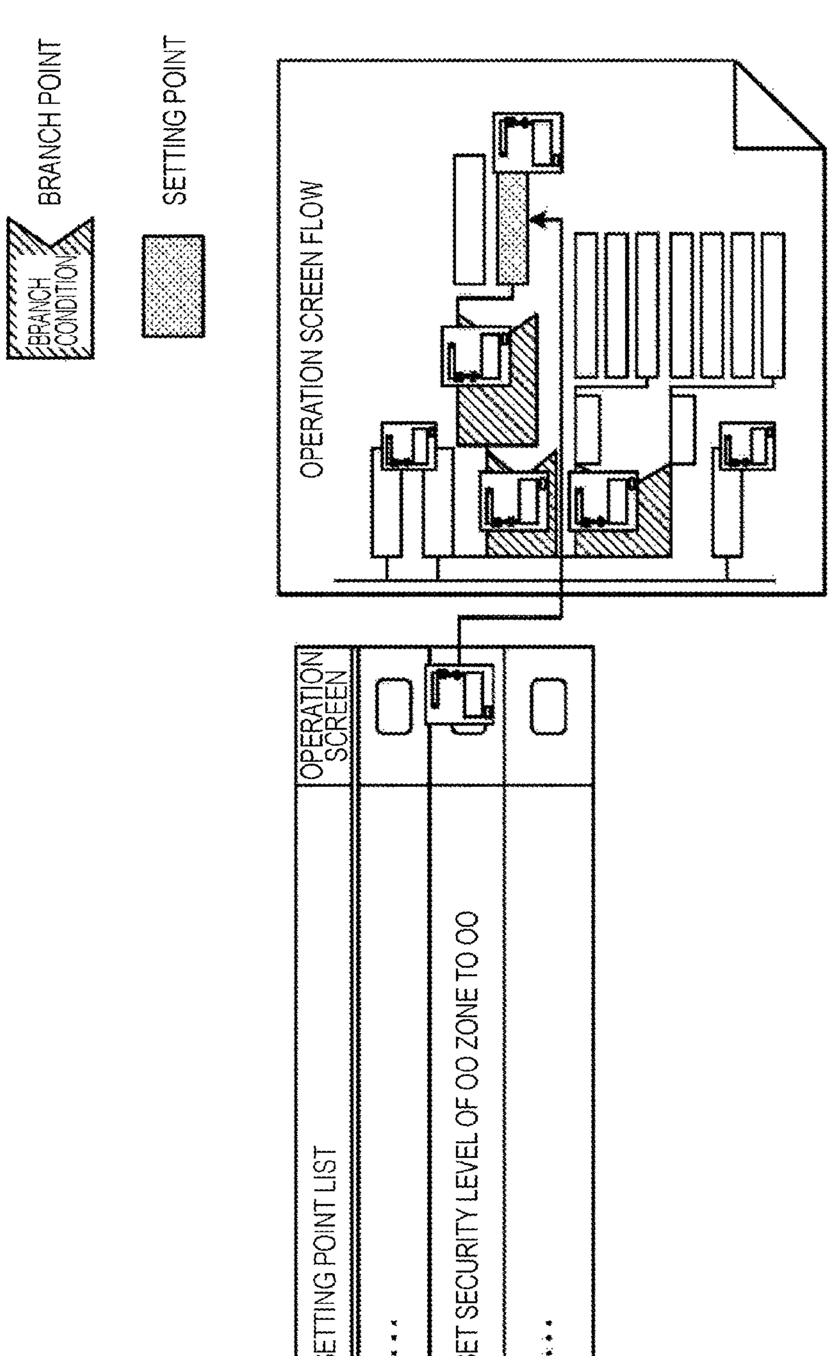
FIG. 6 is a diagram for explaining processing of the generation unit.

Here, FIG. 4 to FIG. 6 are diagrams for explaining processing of the generation unit. As illustrated in FIG. 4, the generation unit 15*b* sets in advance, as a predetermined setting point, a description portion or the like as a target of an operation from a manual (procedure manual) and an index of the manual, and lists the setting points.

Here, each setting point is specified by processing content or the like, for example, "set a security level of a ○○ zone to ○○". In addition, the generation unit 15*b* stores a setting point list 14*b* in which each setting point and the operation screen at the setting point are associated with each other in the storage unit 14.

In addition, as illustrated in FIG. 5, the generation unit 15*b* generates an operation screen flow 14*c* in a PAD format having a tree structure by using an operation screen and an index of a manual (procedure manual), and stores the operation screen flow 14*c* in the storage unit 14. Specifically, the generation unit 15*b* extracts an operation screen on which content of processing is reflected from the manual, sets, as a node, the operation screen of each type of processing, and generates an operation screen flow 14*c* having a tree structure in which the nodes are connected in processing order by referring to the manual and the index (refer to Non Patent Literature 1).

The operation screen flow 14*c* includes a node of a branch point indicating a branch condition. The branch point corresponds to an operation portion that requires advanced determination and attention. Therefore, in the operation support processing to be described later, by presenting the operation screen of the branch point to the operator, it is possible to reliably confirm that the input operation is performed without missing the operation portion that requires advanced determination and attention.

In addition, the generation unit 15*b* associates the operation screen flow 14*c* with the setting point. Specifically, as illustrated in FIG. 6, the generation unit 15*b* associates a node in the operation screen flow 14*c* with each setting point of the setting point list 14*b*. For example, the generation unit 15*b* associates a node of the operation screen flow 14*c* with a setting point by adding information for identifying the setting point corresponding to the node.

The description returns to FIG. 3. The specifying unit 15*c* specifies a node corresponding to the screen that is being operated in the operation screen flow 14*c* by the operator. For example, the specifying unit 15*c* specifies, as a node corresponding to the screen that is being operated, a portion that is an operation screen of a node of the operation screen flow 14*c* and matches with a latest operation log 14*a* which is image data of the screen being operated.

The extraction unit 15*d* extracts, from the operation screen flow 14*c*, a route from the node corresponding to the screen being operated to a setting point at a subsequent stage of the node. At that time, the extraction unit 15*d* extracts a route including a branch point.

Figure 7:
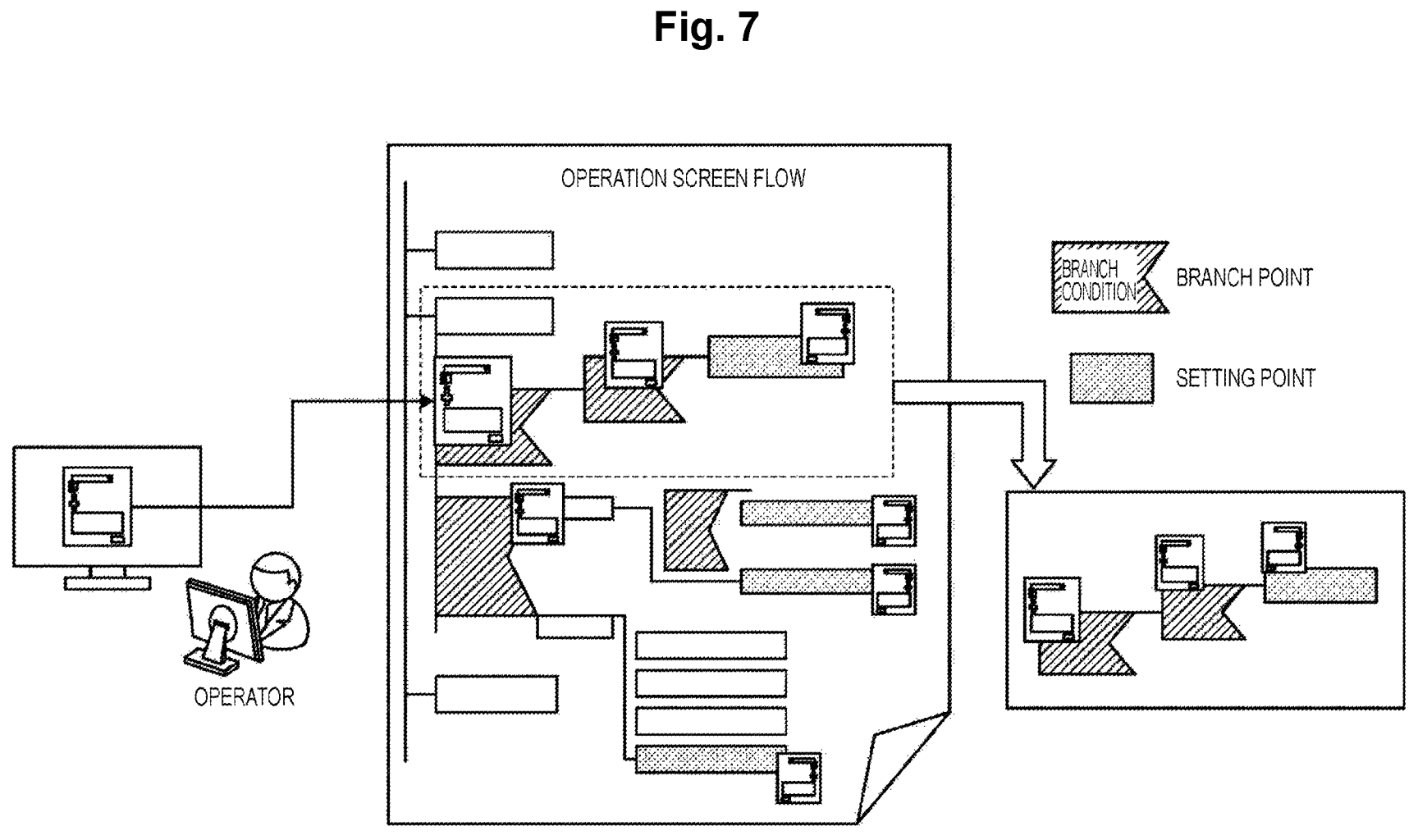
Figure 8:
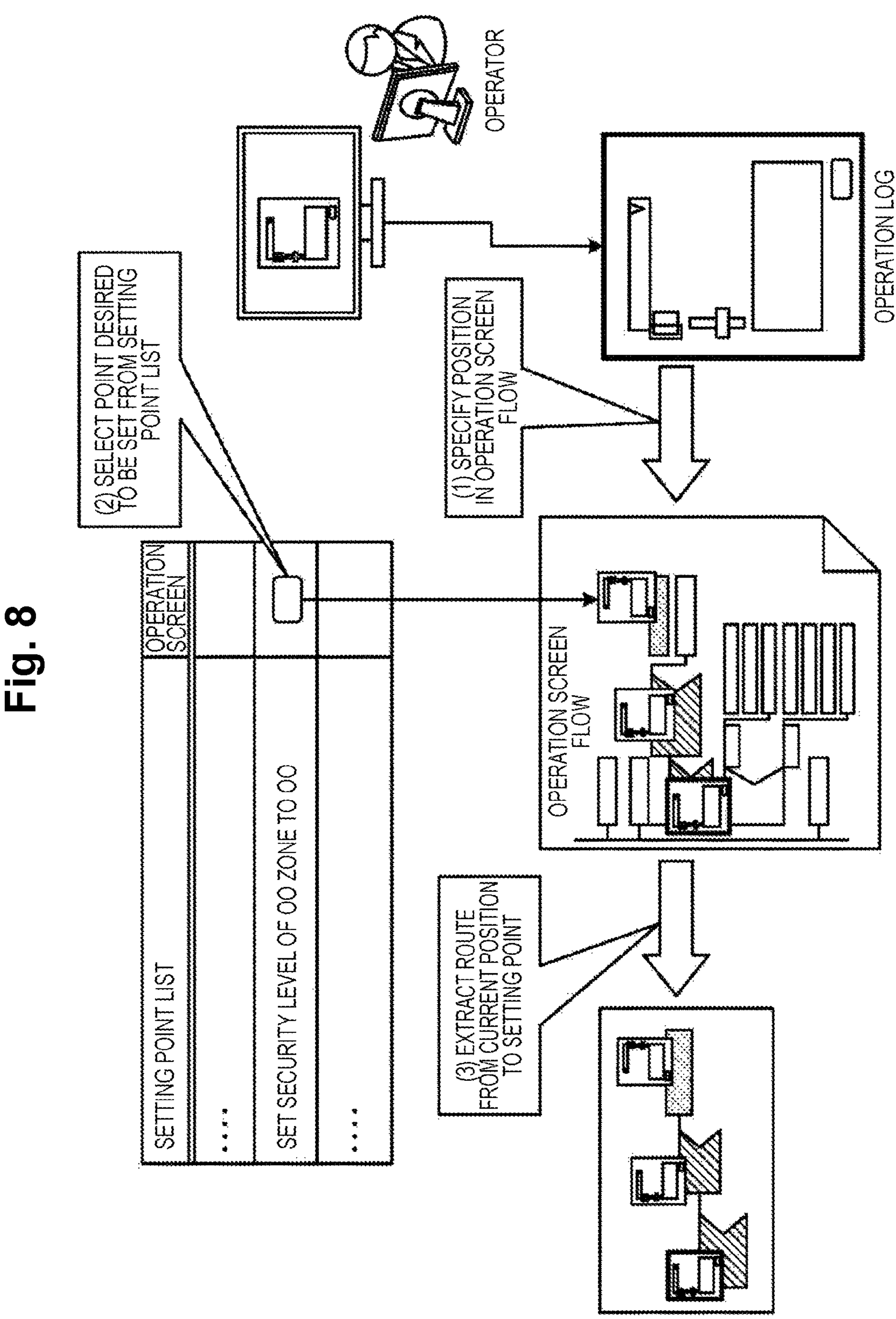
FIG. 8 is a diagram for explaining processing of the extraction unit.

Here, FIG. 7 and FIG. 8 are diagrams for explaining processing of the extraction unit. The extraction unit 15*d* extracts, from the operation screen flow 14*c*, a route from the node corresponding to the screen being operated to the setting point at a subsequent stage of the node, the route being surrounded by a dashed line illustrated in FIG. 7. At that time, the extraction unit 15*d* extracts a route including a branch point. Thereby, a route passing through a branch condition and reaching a node of an operation result is extracted.

Specifically, as illustrated in FIG. 8(1), the specifying unit 15*c* specifies a position of the screen which is being operated and is indicated by a bold frame in the operation screen flow 14*c*. In addition, as illustrated in FIG. 8(2), the extraction unit 15*d* selects a setting point at a subsequent stage of the specified position which is being operated, among the setting points in the setting point list 14*b*. At that time, the extraction unit 15*d* selects, for example, a setting point closest to the specified position which is being operated. Thereby, the setting point as a target of the current operation is selected.

Further, as illustrated in FIG. 8(3), the extraction unit 15*d* extracts a route which is from the specified position being operated to the setting point and includes a branch point. Thereby, in the operation support processing to be described later, it is possible to present, to the operator, an operation screen on the route from the branch point to the setting point as a target of the operation, the branch point being an operation portion that requires advanced determination and attention.

The description returns to FIG. 3. The presentation unit 15*e* presents an operation screen on the extracted route to the operator. For example, the presentation unit 15*e* presents, to the operator, the operation screen included in the route from the position being operated to the setting point as a target of the operation by outputting the operation screen to the output unit 12, the route being extracted by the extraction unit 15*d*, and the operation screen being included in the operation screen flow 14*c*.

At that time, the presentation unit 15*e* may take out the operation screen on the route from the operation screen flow 14*c* and separately display the operation screen, or may display the operation screen on the route in a highlighted manner, for example, by surrounding the operation screen with a frame or changing a color of the operation screen in the operation screen flow 14*c*. Thereby, the operator can easily and reliably perform an input operation without referring to the manual while confirming the operation screen and a transition of the operation screen to a target of the operation.

Figure 9:
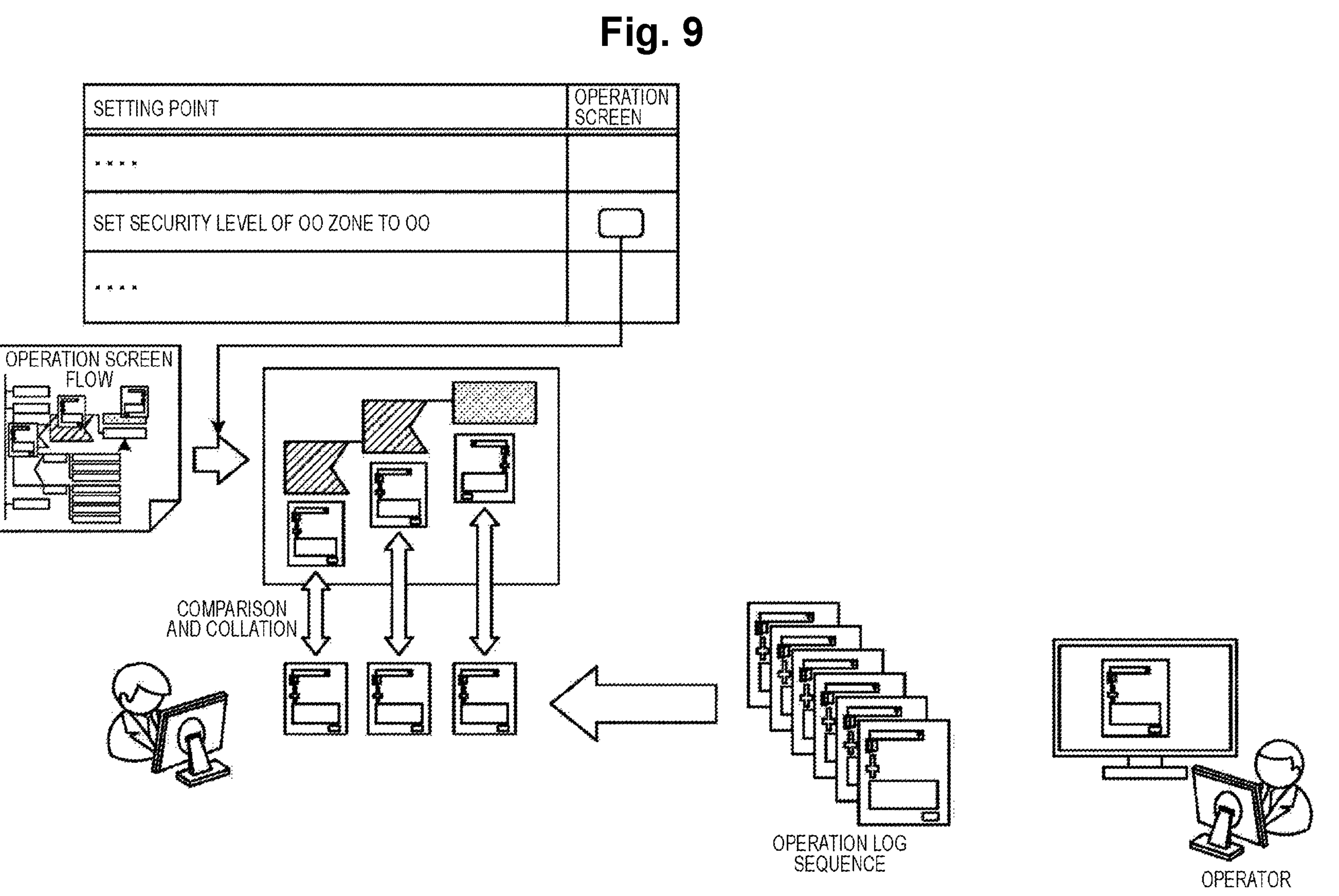
FIG. 9 is a diagram for explaining processing of a collation unit.

The collation unit 15*f* collates the operation screen on the extracted route with the operation log 14*a*. Here, FIG. 9 is a diagram for explaining processing of the collation unit. As illustrated in FIG. 9, the collation unit 15*f* compares and collates an operation screen sequence on the route extracted by the extraction unit 15*d* with an operation log sequence starting from the operation screen as a starting point of the route.

For example, the collation unit 15*f* extracts, from an operation log sequence, an operation log corresponding to a branch point and a setting point on the route by image searching of each operation screen of the operation screen sequence on the route. In addition, the collation unit 15*f* confirms whether or not each operation is correctly performed by comparing each operation screen on the route with each operation log which is extracted. Thereby, the collation unit 15*f* can easily and reliably confirm whether or not the operation is performed according to the manual.

[Operation Support Processing]

Figure 10:
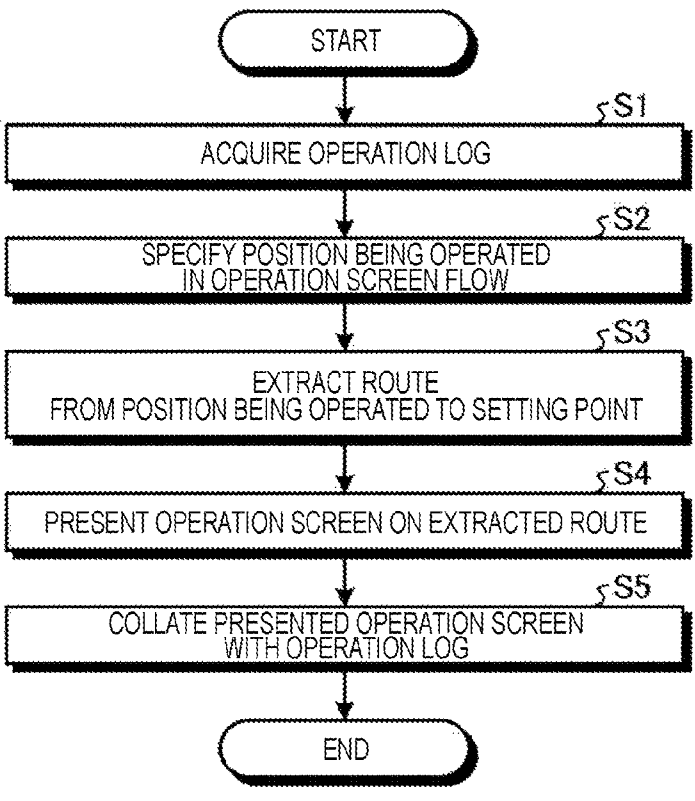
FIG. 10 is a flowchart illustrating an operation support processing procedure.

Next, operation support processing performed by the operation support apparatus 10 according to the present embodiment will be described with reference to FIG. 10. FIG. 10 is a flowchart illustrating an operation support processing procedure. The flowchart of FIG. 10 is started, for example, at a timing when a user instructs the operation support apparatus to start the processing, and is repeatedly executed.

First, the acquisition unit 15*a* acquires, as the operation log 14*a*, an operation screen operated by an operator (step S1). For example, the acquisition unit 15*a* acquires, as the operation log 14*a*, image data by capturing a screen operated by an operator.

Next, the specifying unit 15*c* specifies a position which is being operated by the operator in the operation screen flow 14*c*, that is, a node corresponding to the screen that is being operated (step S2). For example, the specifying unit 15*c* specifies, as a node corresponding to the screen that is being operated, a position that is an operation screen of a node of the operation screen flow 14*c* and matches with a latest operation log 14*a* which is image data of the screen being operated.

Next, the extraction unit 15*d* extracts, from the operation screen flow 14*c*, a route from the node corresponding to the screen being operated to a setting point which is at a subsequent stage of the node and is a target of the operation (step S3). At that time, the extraction unit 15*d* extracts a route including a branch point.

In addition, the presentation unit 15*e* presents an operation screen on the extracted route to the operator (step S4). For example, the presentation unit 15*e* presents, to the operator, the operation screen included in the route from the position being operated to the setting point as a target of the operation.

In addition, the collation unit 15*f* compares and collates an operation screen sequence on the route with an operation log sequence starting from the operation screen as a starting point of the route (step S5). For example, the collation unit 15*f* confirms whether or not each operation is correctly performed by comparing each operation screen on the route with each operation log 14*a* which is extracted from the operation log sequence and corresponds to each point on the route.

The collation unit 15*f* outputs a collation result to the output unit 12, another apparatus such as a management apparatus via the communication control unit 13, the storage unit 14, or the like. Thereby, a series of operation support processing is ended.

As described above, in the operation support apparatus 10 according to the present embodiment, the storage unit 14 stores a setting point list 14*b* in which a predetermined setting point and an operation screen at the setting point are associated with each other. In addition, the generation unit 15*b* sets, as a node, the operation screen on which processing content is reflected, generates an operation screen flow 14*c* representing a processing order of the node by using the operation manual, and associates the operation screen flow 14*c* and the setting point. In addition, the extraction unit 15*d* extracts, from the operation screen flow 14*c*, a route from the node corresponding to the screen being operated to a setting point at a subsequent stage of the node. In addition, the presentation unit 15*e* presents an operation screen on the extracted route to the operator.

Thereby, the operator can easily and reliably perform an input operation without referring to the manual while confirming the operation screen and a transition of the operation screen to a target of the operation. As described above, according to the operation support apparatus 10, it is possible to reliably confirm that the operation is being performed according to the manual.

In addition, the acquisition unit 15*a* acquires, as the operation log 14*a*, an operation screen operated by an operator. Further, the collation unit 15*f* collates the operation screen on the extracted route with the operation log 14*a*. Thereby, it is possible to easily and reliably confirm whether or not the operation is performed according to the manual.

In addition, the extraction unit 15*d* extracts a route including a branch point. Thereby, by presenting the operation screen of the branch point to the operator, it is possible to reliably confirm that the input operation is performed without missing the operation portion that requires advanced determination and attention.

[Program]

It is also possible to create a program in which the processing executed by the operation support apparatus 10 according to the above embodiment is described in a language which can be executed by a computer. As an embodiment, the operation support apparatus 10 can be implemented by installing, as packaged software or online software, an operation support program for executing the operation support processing in a desired computer. For example, by causing an information processing apparatus to execute the operation support program, the information processing apparatus can be caused to function as the operation support apparatus 10. The information processing apparatus mentioned here includes a desktop or notebook personal computer. In addition, the information processing apparatus also includes a mobile communication terminal such as a smartphone, a mobile phone, and a personal handyphone system (PHS), a slate terminal such as a personal digital assistant (PDA), and the like. Further, the function of the operation support apparatus 10 may be implemented in a cloud server.

Figure 11:
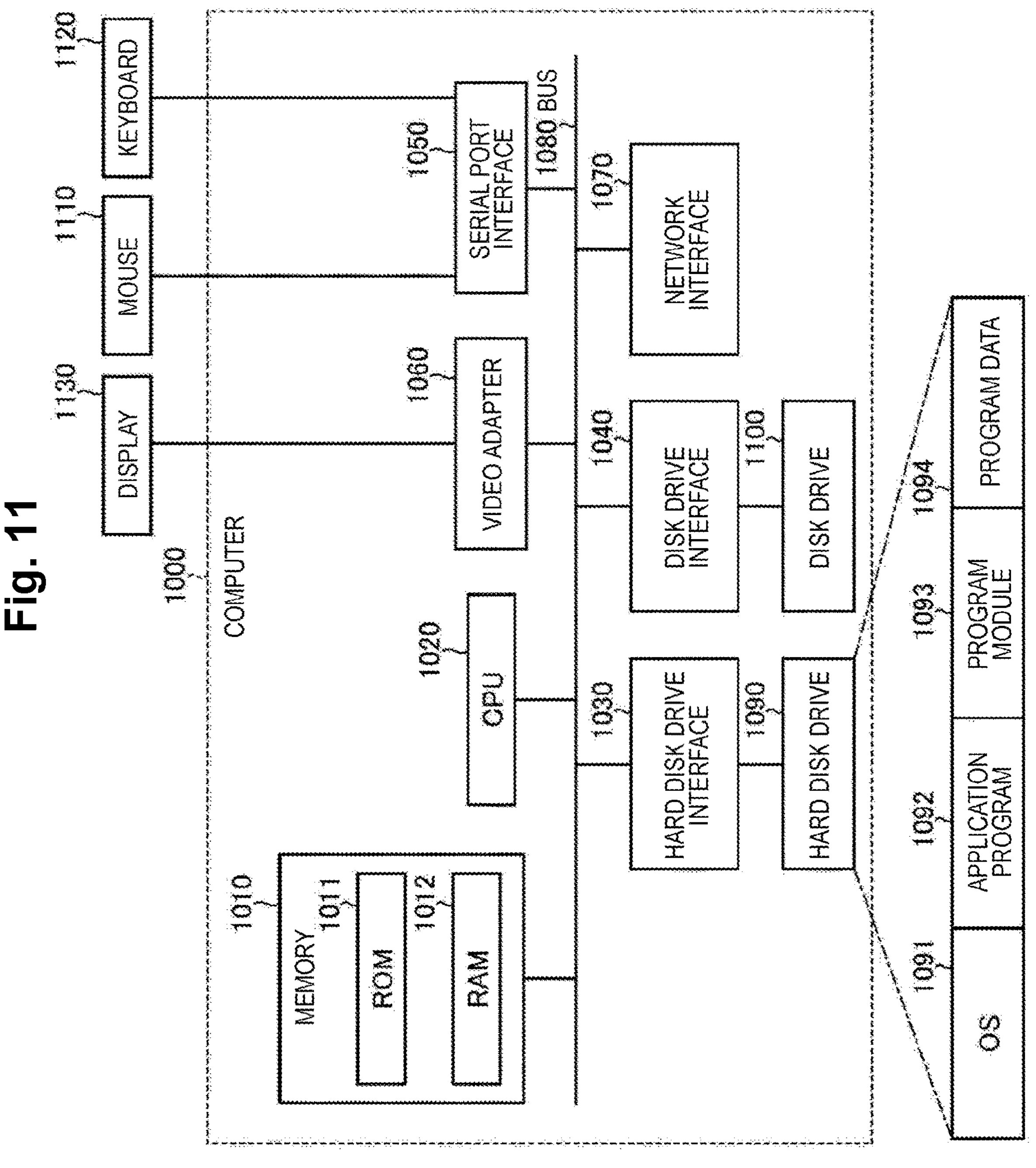
FIG. 11 is a diagram illustrating an example of a computer that executes an operation support program.

FIG. 11 is a diagram illustrating an example of a computer that executes an operation support program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a removable storage medium such as a magnetic disk or an optical disk is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. The information described in the above embodiment is stored, for example, in the hard disk drive 1031 or the memory 1010.

In addition, the operation support program is stored, for example, in the hard disk drive 1031, as the program module 1093 in which commands to be executed by the computer 1000 are described. Specifically, the program module 1093 in which each piece of processing to be executed by the operation support apparatus 10 described in the above embodiment is described is stored in the hard disk drive 1031.

Further, data to be used for information processing performed by the operation support program is stored, for example, in the hard disk drive 1031, as the program data 1094. In addition, the CPU 1020 reads, in the RAM 1012, the program module 1093 and the program data 1094 stored in the hard disk drive 1031 as necessary, and executes each procedure described above.

Note that the program module 1093 and the program data 1094 related to the operation support program are not limited to being stored in the hard disk drive 1031, and may be stored, for example, in a removable storage medium and may be read by the CPU 1020 via the disk drive 1041 or the like. Alternatively, the program module 1093 and the program data 1094 related to the operation support program may be stored in another computer connected via a network such as LAN or a wide area network (WAN), and may be read by the CPU 1020 via the network interface 1070.

Although the embodiment to which the invention made by the present inventor is applied has been described above, the present invention is not limited by the description and drawings for explaining a part of the disclosure of the present invention according to the present embodiment. In other words, other embodiments, examples, operation techniques, and the like made by those skilled in the art and the like based on the present embodiment are all included in the scope of the present invention.

REFERENCE SIGNS LIST

10 Operation support apparatus
11 Input unit
12 Output unit
13 Communication control unit
14 Storage unit
**14*a*** Operation log
**14*b*** Setting point list
**14*c*** Operation screen flow
15 Control unit
**15*a*** Acquisition unit
**15*b*** Generation unit
**15*c*** Specifying unit
**15*d*** Extraction unit
**15*e*** Presentation unit
**15*f*** Collation unit

The invention claimed is:

1. An operation support apparatus comprising a processor configured to execute operations comprising:
- stores a predetermined setting point and an operation screen associated with the predetermined setting point;
- generating, based on the predetermined setting point and the operation screen, an operation screen flow, wherein the operation screen flow indicates a processing order of the node according to an operation manual, and the node is associated with the operation screen that represents processed content as described in the operation manual;
- associating the operation screen flow with the predetermined setting point;
- specifying the node corresponding to a performed action on the operation screen and capturing a screen of the operation screen to match the predetermined setting point, thereby confirming steps specified the operation manual;
- extracting, from the operation screen flow, a route, wherein the route starts from the node associated with a current operation screen to the predetermined setting point, wherein the predetermined setting point is subsequent to the node; and
- displaying, the current operation screen and the operation screen associated with the predetermined setting point on the extracted route.

2. The operation support apparatus according to claim 1, the processor further configured to execute operations comprising:
- acquiring, as an operation log, the operation screen operated by an operator; and
- collating the operation screen on the route according to the operation log.

3. The operation support apparatus according to claim 1, wherein the extracting further comprises extracting the route including a branch point, wherein the branch point represents an operation portion to display and to receive a determination by the operator for processing a branch condition.

4. A computer implemented method for support operations, the method comprising:
- storing a predetermined setting point and an operation screen associated with the predetermined setting point;
- generating, based on the predetermined setting point and the operation screen, an operation screen flow, wherein the operation screen flow indicates a processing order of the node according to an operation manual, and the node is associated with the operation screen that represents processed content as described in the operation manual;
- specifying the node corresponding to a performed action on the operation screen and capturing a screen of the operation screen to match the predetermined setting point, thereby confirming steps specified the operation manual;
- extracting, from the operation screen flow, a route, wherein the route starts from the node associated with a current operation screen to the predetermined setting point, wherein the predetermined setting point is subsequent to the node; and
- displaying, the current operation screen and the operation screen associated with the predetermined setting point on the extracted route.

5. A computer-readable non-transitory recording medium storing computer-executable program instructions that when executed by a processor cause a computer system to execute operations comprising:
- storing a predetermined setting point and an operation screen associated with the predetermined setting point;
- generating, based on the predetermined setting point and the operation screen, an operation screen flow, wherein the operation screen flow indicates a processing order of the node according to an operation manual, and the node is associated with the operation screen that represents processed content as described in the operation manual;
- specifying the node corresponding to a performed action on the operation screen and capturing a screen of the operation screen to match the predetermined setting point, thereby confirming steps specified the operation manual;
- extracting, from the operation screen flow, a route, wherein the route starts from the node associated with a current operation screen to the predetermined setting point, wherein the predetermined setting point is subsequent to the node; and
- displaying, the current operation screen and the operation screen associated with the predetermine setting point on the extracted route.

6. The operation support apparatus according to claim 1, wherein the operation manual includes a plurality of operation screens, wherein the plurality of operation screens includes the operation screen.

7. The operation support apparatus according to claim 1, wherein the operation screen flow is based at least on a plurality of operation screens, and the operation screen flow uses a problem analysis diagram format with a tree structure, and the problem analysis diagram format includes the predetermined setting point.

8. The operation support apparatus according to claim 1, wherein the display further comprises displaying, with emphasis, the operation screen associated with the predetermined setting point while processing operations associated with the predetermined setting.

9. The operation support apparatus according to claim 1, wherein the display further comprises displaying, based on a comparison between the operation log associated with processing the predetermined setting in an operation log and the operation screen associated with the predetermined setting.

10. The computer implemented method according to claim 4, further comprising:

acquiring, as an operation log, the operation screen operated by an operator; and collating the operation screen on the route according to the operation log.

11. The computer implemented method according to claim 4, wherein the extracting further comprises extracting the route including a branch point, wherein the branch point represents an operation portion to display and to receive a determination by the operator for processing a branch condition.

12. The computer implemented method according to claim 4, wherein the operation manual includes a plurality of operation screens, wherein the plurality of operation screens includes the operation screen.

13. The computer implemented method according to claim 4, wherein the operation screen flow is based at least on a plurality of operation screens, and the operation screen flow uses a problem analysis diagram format with a tree structure, and the problem analysis diagram format includes the predetermined setting point.

14. The computer implemented method according to claim 4, wherein the display further comprises displaying, with emphasis, the operation screen associated with the predetermined setting point while processing operations associated with the predetermined setting.

15. The computer implemented method according to claim 4, wherein the display further comprises displaying, based on a comparison between the operation log associated with processing the predetermined setting in an operation log and the operation screen associated with the predetermined setting, whether an input is correct.

16. The computer-readable non-transitory recording medium according to claim 5, the computer-executable program instructions when executed further causing the computer system to execute operation comprising:

acquiring, as an operation log, the operation screen operated by an operator; and collating the operation screen on the route according to the operation log.

17. The computer-readable non-transitory recording medium according to claim 5, wherein the extracting further comprises extracting the route including a branch point, wherein the branch point represents an operation portion to display and to receive a determination by the operator for processing a branch condition.

18. The computer-readable non-transitory recording medium according to claim 5, wherein the operation manual includes a plurality of operation screens, wherein the plurality of operation screens includes the operation screen.

19. The computer-readable non-transitory recording medium according to claim 5, wherein the operation screen flow is based at least on a plurality of operation screens, and the operation screen flow uses a problem analysis diagram format with a tree structure, and the problem analysis diagram format includes the predetermined setting point.

20. The computer-readable non-transitory recording medium according to claim 5, wherein the display further comprises displaying, with emphasis, the operation screen associated with the predetermined setting point while processing operations associated with the predetermined setting.

* * * * *